Oct. 30, 1956     W. S. WOLFRAM     2,768,536
TRANSVERSE ENGINE AND TRANSMISSION

Filed June 2, 1955     2 Sheets—Sheet 1

INVENTOR
WILLIAM S. WOLFRAM

BY *G. L. De Matt*

ATTORNEY

Oct. 30, 1956 W. S. WOLFRAM 2,768,536
TRANSVERSE ENGINE AND TRANSMISSION
Filed June 2, 1955 2 Sheets-Sheet 2

INVENTOR
WILLIAM S. WOLFRAM

BY *G. L. DeMott*

ATTORNEY

United States Patent Office 2,768,536
Patented Oct. 30, 1956

2,768,536
TRANSVERSE ENGINE AND TRANSMISSION

William S. Wolfram, Birmingham, Mich., assignor to General Motors Corporation, Detroit, Mich., a corporation of Delaware Application June 2, 1955, Serial No. 512,653

13 Claims. (Cl. 74—664)

The present invention pertains to a split torque power transmission mechanism and more particularly to a mechanism in which the torque output is efficiently matched with torque demand. The mechanism generally includes a pair of torque multiplying mechanisms connected in parallel with a source of prime mover energy so as to provide a plurality of different capacity power paths to any means to be driven by the mechanism.

The problem extant in the transmission of mechanical power is to provide means having sufficient capacity to satisfy maximum power demand but which can also supply intermediate power demands efficiently. This problem is particularly acute in automobile power transmission mechanisms where the problem of efficient operation is compounded by size and cost considerations.

In an automobile using a single fluid torque converter the converter must be designed to provide maximum torque multiplication to satisfy the maximum demand for power. Such converter will normally be most efficient when operating at maximum torque capacity. When the power demand is, for instance, only one-half of the maximum torque multiplying capacity of the converter, the power will be supplied at greatly reduced efficiently or, in other words, at relatively increased cost in horsepower.

The ultimate in solving the problem of efficiently matching power demand and torque capacity would be either to provide a torque converter having an equally high efficiency during all stages of torque multiplication, or alternatively, to provide a multiplicity of torque converters each operating to supply power within its range of maximum efficiency. Since a practical converter of the first type is not known, the present invention is based generally on the second alternative.

In providing such a power transmission mechanism a concerted effort has been made to achieve a compact design which is adapted to be transversely mounted with respect to the longitudinal axis of a motor vehicle. The torque or power output of the instant engine is adapted to be selectively split between power paths each of which includes a fluid torque converter. The power paths are adapted to be recombined beyond the torque converters so as to provide a single power output from the mechanism but which single output may be the joint or several contributions of the respective power paths.

For practical purposes, constituting mainly size and cost, the subject power transmission mechanism includes a radial or X type engine axially flanked by a pair of different capacity torque converters. The engine and torque converters are uniquely related to each other and to a differential output mechanism to provide a compact, efficient and relatively inexpensive power transmission mechanism of general utility and particularly suited to use in a small or lightweight type vehicle.

The operation, advantages and scope of the subject mechanism will be set forth in greater detail in the ensuing specification and appended claims.

It is to be understood that the drawings are diagrammatic in nature and are not necessarily intended to represent the ultimate commercial embodiment of this invention.

Figure 1:
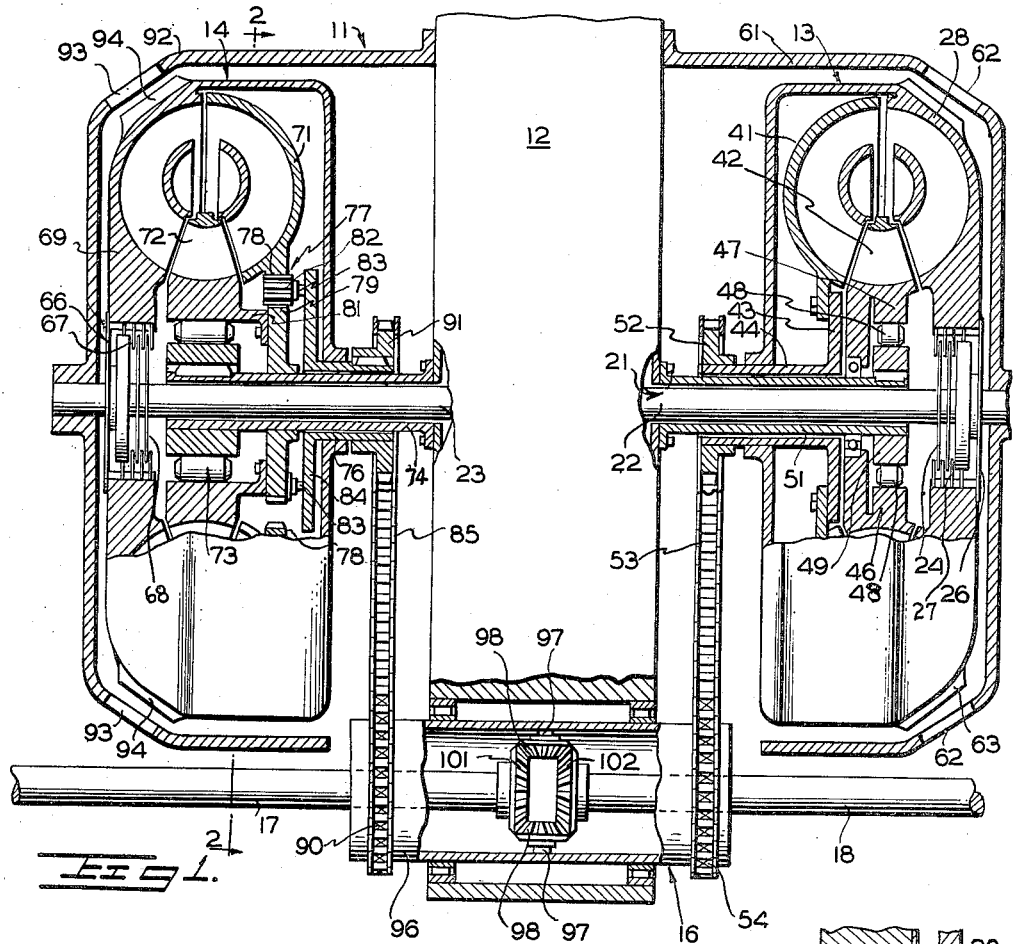
Figure 1 is a partially sectioned elevational view of one form of power transmission mechanism embodying the invention.
Figure 2:
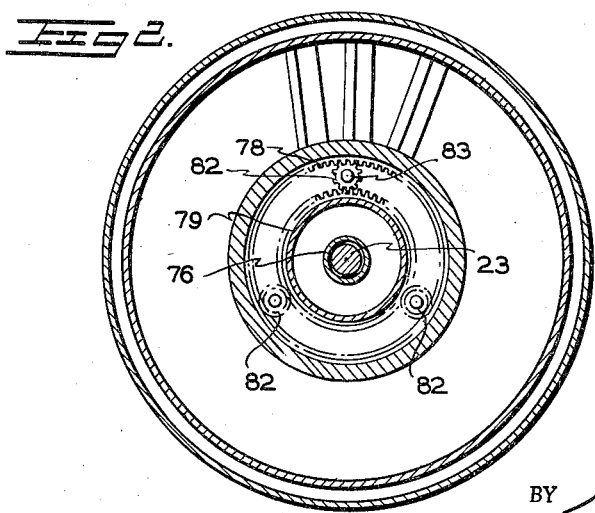
Figure 2 is a view along line 2—2 of Figure 1 particularly showing the planetary gear arrangement which is combined with one of the torque converters.

In Figure 1, a power transmission device is shown generally at 11 and includes an engine 12 disposed between a pair of torque multiplying mechanisms which in the preferred embodiment of the invention, are fluid torque converters 13 and 14. To render the power transmission device 11 as compact as possible, engine 12 is preferably of the radial or X type. It is apparent, however, that an in-line or V type engine can be similarly employed if the longitudinal displacement of the mechanism is not a primary consideration.

Disposed below the engine and torque converters is a differential device 16 adapted to transmit drive to a pair of wheel axles 17 and 18 either one of which axles may be termed a power transmission mechanism output shaft or an output load shaft to designate a shaft adapted to directly drive the load.

The engine, per se, does not form a part of this invention but for the sake of economy of manufacture and operation may satisfactorily be of the four cylinder-two cycle type shown in copending application S. N. 485,113 Czuba et al, filed January 31, 1955. Engine 12 includes a crankshaft 21 which extends axially beyond the engine to provide a pair of shaft portions 22 and 23. Inasmuch as the present power transmission device is preferably of the transverse type, crankshaft 21 is disposed generally parallel to the axis of axles 17 and 18, or transverse to the longitudinal axis of the vehicle.

The fluid torque converters 13 and 14 are disposed concentrically with respect to the extended portions 22 and 23 of the crankshaft 21. Considering first the right-hand fluid torque converter 13, it will be seen in Figure 1 that crankshaft portion 22 has a driving member 24 of a clutch 26 disposed at one end thereof. Clutch member 24 is adapted to drive a corresponding clutch member 27 formed on the casing of an input or impeller member 28 of the torque converter.

Figure 1A:
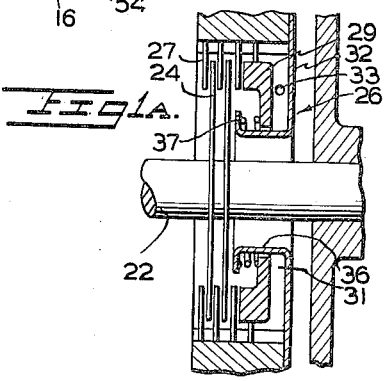
Figure 1A is a detail view of the torque converter impeller clutch shown diagrammatically in Figure 1.

The clutch 26, as best shown in Figure 1A, may be hydraulically actuated by a servo mechanism which includes an annular piston 29 axially movable within a chamber 31 defined by a casing member 32 and piston 29. Fluid under pressure may be admitted to chamber 31 from a port 33 to move the piston to the left to engage the clutch members 24 and 27. An axially extending portion 36 of the servo casing has a flange 37 adapted to seat a spring 38 which biases piston 29 to the right or clutch disengaged position when the pressure in chamber 31 is exhausted.

Torque converter 13 also includes a turbine member 41 and a stator member 42. The turbine member 41 is connected through a flange member 43 to a coaxial output shaft 44. The stator member 42 is mounted upon a one-way brake 46 which is adapted to restrain the stator against reverse rotation relative to the impeller and turbine members.

One-way brake 46 includes an outer or rotating member 47 fixed to or integrally formed with the stator, roller bearing members 48, and an inner race or non-rotating member 49 which is splined or otherwise fixed to a coaxial sleeve 51. Sleeve 51 is fixed against rotation to the engine 12 in any convenient manner.

Secured to the output shaft 44 is a gear or sprocket member 52. A silent drive drop chain 53 transmits the drive from the sprocket 52 to the differential 16 through another gear or sprocket member 54 mounted on the differential.

Torque converter 13 has a casing 61 disposed therearound and connected in any convenient way to the engine 12. The transmission casing includes a plurality of peripherally disposed holes 62 which permit cooling air to flow around the torque converter. In order to further facilitate the cooling of the torque converter, cooling fins 63 are exteriorly disposed on the impeller 28.

The left-hand torque converter is generally similar to the right-hand unit, but differs therefrom in several important respects. The left-hand engine crankshaft portion 23 provides clutch 66, which may be structurally and functionally the same as clutch 26 and will not, therefore, be described in detail. Suffice it to observe that when driving and driven clutch members 67 and 68 are coupled together drive from the engine 12 is transmitted to the impeller member 69 which in turn drives a turbine member 71.

A stator member 72 is mounted upon a one-way brake 73 functionally similar to that of the right-hand torque converter. One-way brake 73 is adapted to be similarly grounded to the engine through a non-rotating coaxial shaft 74.

In the left-hand torque converter the turbine is again the driven member and drives an output shaft 76. However, in this case an additional torque multiplying device 77 is disposed between the turbine and the converter output shaft. The torque multiplying device 77 is a planetary gear set in which the ring or annulus gear 78 is fixedly connected to and driven by the turbine member 71. A sun or reaction gear 79 is connected directly to the stator 72 through a member 81. The planet or pinion gears 82 are mounted individually on stub shafts 83 which are in turn unitarily connected to a planet carrier plate 84. The planet carrier 84 is in turn drivingly connected to or formed integrally with the converter output shaft 76.

It will thus be seen that the left-hand torque multiplying mechanism not only provides torque multiplication through the fluid torque converter but also through the planetary gear set 77. When fluid torque converter 14 is in the torque multiplying stage, stator 72 is held against reverse rotation by the one-way brake. Inasmuch as the sun gear 79 is secured to the stator, it is likewise restrained against rotation. Therefore, as the ring gear is driven by the turbine member, the planet gears walk around the sun gear at a reduced speed thus driving the planet carrier 94 and output shaft 76 at a reduced speed but with increased torque relative to turbine 71. As the torque converter 14 begins the transition from the torque multiplying stage to the fluid coupling stage, the stator 72 begins to rotate at an increasing speed in the same direction as the impeller 69 and the turbine member 71. In this way, the sun gear 79 also begins to rotate in the same direction as the stator and accordingly in the same direction as the ring gear 78. Thus, simultaneously the torque multiplication in both the torque converter and the planetary gear set are being reduced and continue to decrease until such time as both the converter and the gear set are no longer multiplying torque, but transmitting power at a substantially straight one-to-one drive ratio.

Thus, by the use of the planetary gear set 77 in combination with the fluid torque converter, the torque output of the left-hand unit may be considerably increased over that of the right-hand unit without using a physically larger torque converter.

It is apparent that to obtain an equivalent torque output from the left-hand unit by means of a fluid torque converter alone would necessitate a substantial increase in the diametrical size of the unit. This size increase would increase the vertical displacement of the overall mechanism and accordingly reduce the compactness of the mechanism which at least in small type vehicles is a significant consideration.

Another advantage of the converter-planetary combination is that the torque output of such a unit may be changed by changing the sizes of the gear components.

Mounted on the output shaft 76 of the left-hand converter unit is a gear or sprocket member 91 which also transmits drive from the left-hand unit to the differential 16 through a silent drop chain 85 and a sprocket or gear member 90 mounted on casing 96.

A torque converter casing 92 is also provided for the left-hand unit 14 and also includes ventilating holes 93 formed in the periphery thereof. Similarly, cooling fins 94 are mounted on the casing of the impeller member 69 in order to increase the flow of cooling air around the torque converter.

Differential 16 includes a cylindrical casing 96 with the gear or sprocket members 54 and 90 fixed thereto. Inside cylinder 96 there are centrally disposed stub shafts 97 having pinion gears 98 rotatably mounted thereon. The wheel axles 17 and 18 have bevel gears 101 and 102 fixed at the inner ends thereof and which gears are adapted to cooperate with the pinion gears 101 and 102 to provide a differential drive to the rear wheels.

Figure 3:
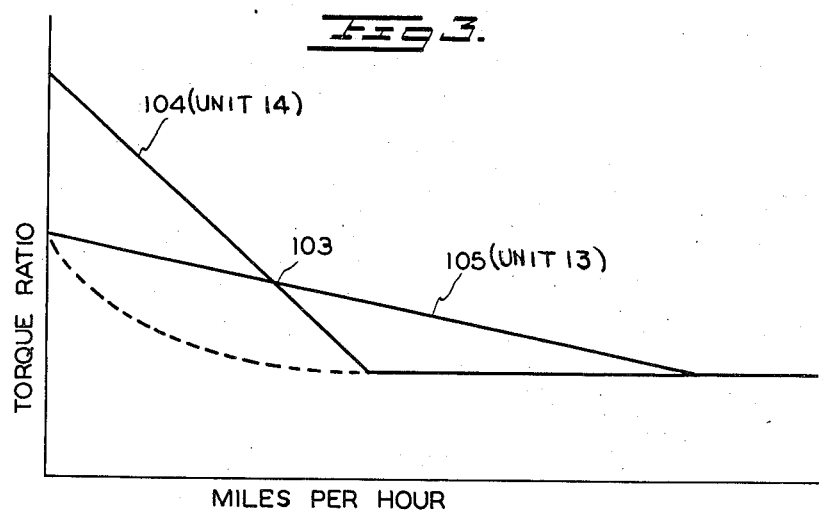
Figure 3 is a graphic representation of the split torque flow through the subject mechanism.

As thus far described, the power transmission mechanism 11 includes a radial engine 12 having disengagingly connected thereto a high capacity or high torque output mechanism 14 and a relatively lower torque output member 13. One manner of operating the power transmission mechanism may be better understood by referring to the graph shown in Figure 3. In Figure 3 it will be seen that the left torque multiplying unit 14 is coupled to the engine 12 during conditions of highest torque demand, such as when starting, while the right-hand unit is employed for periods of moderate torque demand, such as might occur when it is desired to pass another vehicle underway. Both units are operative and function substantially as fluid couplings during normal cruising of the vehicle.

The actual control mechanism for selectively controlling the operation of the clutches 26 and 66 does not form a part of this invention, and therefore is not shown. However, it is clear that the clutches may either be manually or automatically operated by means well known in the transmission control art.

Specifically, the normal sequence of operation for the transmission device is as follows:

With the vehicle standing still, both clutches 26 and 66 may be uncoupled or disconnected so that no drive is provided for either torque converter and vehicle creep is thereby avoided. When starting the vehicle, clutch 66 is applied. In this way the initial drive or power would flow from engine 12 through the left torque multiplying mechanism 14 to the differential 16 and thence to the driving axles 17 and 18. For normal cruising both clutches are applied, and the engine torque splits between the right and left power paths with each of the mechanisms 13 and 14 transmitting a substantially 1:1 drive to the differential. With the vehicle underway and with a sudden demand for increased power or torque, but not sufficient to require the extra high output of the left-hand torque converter, the left-hand clutch 66 would be disconnected while the right-hand clutch would remain applied so that drive would proceed from the engine through the right-hand converter to the differential and thence to the rear axles. Once the intermediate power demand, as in the passing situation, has ended, the left-hand clutch is again applied and drive proceeds through both the left and right-hand units which again function substantially as fluid couplings.

The effectiveness of using the right-hand unit 13 for intermediate power demand can be seen in Figure 3 by noting that as the vehicle accelerates past the transition point 103, where left and right unit torque output lines 104 and 105 cross, the torque multiplication of the lefthand unit drops off precipitately, while that of the righthand unit drops off more gradually. Thus the right unit provides relatively greater torque multiplication than the left unit at vehicle speeds beyond the transition point, which for illustrative purposes may occur at 20 M. P. H.

Figure 4:
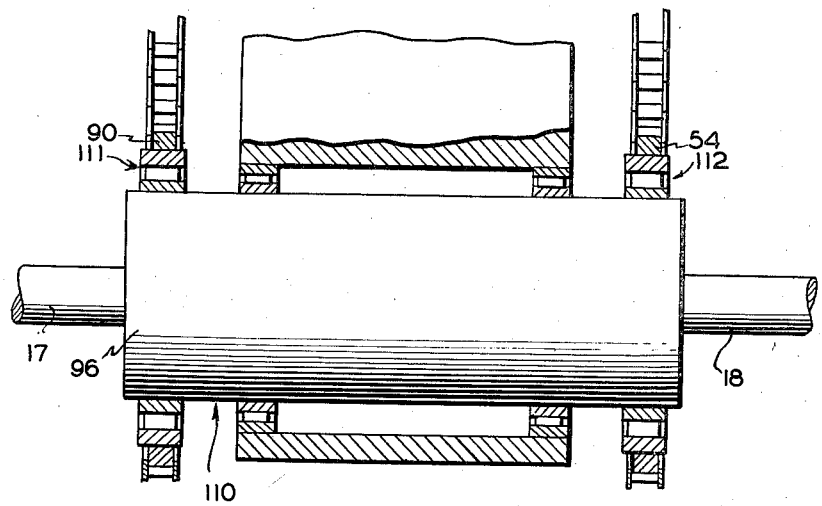
Figure 4 is a fragmentary view of a modification of the differential mechanism of Figure 1.

A modified type differential mechanism 110 is shown in Figure 4. In this modification one-way clutches 111 and 112 are provided between the sprocket members 90 and 54 and the differential cylinder 96. The clutches 111 and 112 are so arranged that as long as the respective sprocket members are tending to drive the differential cylinder the sprockets will be locked to the cylinder. On the other hand, the clutches will release the drive connection between the sprockets if the speed of the differential cylinder tends to exceed that of the sprocket. In this way if one of the torque multiplying mechanisms 13 or 14 is tending to drive the differential casing faster than the other, the slower mechanism will be disconnected from the drive train. In this way the power output of the predominating torque multiplying mechanism will be utilized only in driving the axles, and no power will be lost in driving the other mechanism. To illustrate, as noted above, when the vehicle is under way it may be desired to pass another vehicle, in which case the left-hand clutch 66 is disconnected, the drive through the left-hand torque multiplying unit ceases. The driving power is thus supplied solely by the right-hand torque multiplying unit 13. However, with the differential as constructed in Figure 1, the right-hand unit 13 in driving the differential casing 96 not only drives axles 17 and 18 but also drives the turbine member 71 of the left-hand unit 14 via sprocket 90, chain 85 and gear set 77. In this way, the reverse power flow through the left-hand unit creates a hydraulic drag in the torque converter 14 with a resultant loss of power. By providing the overrunning clutch 111, this power loss is eliminated since as the differential casing 96 begins to drive sprocket 90 the overrunning clutch will release the driving connection, and the differential casing will rotate freely with respect to the sprocket and accordingly no drive will be transmitted to the non-power producing turbine member 71.

Likewise, any time both units are operating to provide power, if the power delivered by one unit to the differential exceeds that delivered by the other unit, the appropriate overrunning clutch will release the drive connection between the lower power producing unit and the differential until such time as the latter unit is able to supplement the torque output of the differential.

Using the differential modification of Figure 4 results in a more overall efficient power transmission mechanism by preventing the torque converters from cross feeding to one another.

The appended claims in conjunction with the illustrative embodiments hereinbefore described are intended to indicate the scope of the subject invention.

What is claimed is:

1. A power transmission mechanism including an engine, an engine crankshaft, a pair of torque multiplying devices disposed on opposite sides of said engine, means for selectively coupling said devices to said crankshaft, a transmission mechanism output shaft and a means for connecting each of said devices to said output shaft.

2. A power transmission device having an engine and an output load shaft, means providing a plurality of power paths from said engine to said output load shaft, said means including a torque multiplying mechanism in each of said power paths, clutches for selectively coupling said engine to said mechanisms so that drive to said output load shaft may be through said power paths severally or jointly, means adapted to combine the torque outputs of said torque multiplying mechanisms, and means drivingly connecting said combining means to said output load shaft.

3. A power transmission device including in combination a radial engine, a pair of fluid torque converters, means for selectively coupling said engine and said torque converters, a pair of power output load shafts, a differential mechanism adapted to drive said shafts, and means drivingly connecting said torque converters to said differential.

4. A power transmission device including in combination an engine, a pair of driving axles, a differential mechanism for transmitting drive to said axles, and means providing a pair of power paths from said engine to said differential, said means including a high capacity torque multiplying mechanism in one of said power paths, a lower capacity torque multiplying mechanism in the other power path, means for individually coupling said mechanisms to said engine so that drive to said axles may be through said power paths severally or jointly, and means drivingly connecting said torque multiplying torque mechanisms to said differential.

5. A motor vehicle including in combination a pair of driving axles, an engine having a crankshaft substantially parallel to the axis of said axles, a pair of torque converters, means for coupling one converter to one end of said crankshaft, means for coupling the other converter to the other end of said crankshaft, a differential device adapted to transmit drive to said axles, and means for drivingly connecting said torque converters to said differential device.

6. A motor vehicle power transmission device including an engine, an engine crankshaft, the ends of said crankshaft extending beyond said engine, a first fluid torque converter disposed proximate one end of said crankshaft, said torque converter including an impeller, a turbine and an output shaft, clutch means for coupling said impeller to said crankshaft, said turbine drivingly connected to said output shaft, a torque multiplying device operatively connected intermediate said turbine and said output shaft, said torque multiplying device being adapted to drive said output shaft at a reduced speed and increased torque relative to said turbine member, a second fluid torque converter disposed proximate the other end of said crankshaft, clutch means for coupling said second torque converter to said engine, a pair of driving axles, a differential mechanism adapted to transmit drive to said axles, a drive element connecting said first converter output shaft to said differential, and a similar drive element operatively connecting said second torque converter to said differential.

7. A motor vehicle power transmission device including in combination an engine, a pair of fluid torque converters, means selectively coupling said engine and said torque converters, a pair of driving axles, a differential mechanism adapted to drive said axles, and means for drivingly connecting each of said torque converters to the differential, said means including devices adapted to automatically disconnect the driving connection between each torque converter and the differential when the speed of the differential exceeds that of the torque converter.

8. A motor vehicle power transmission device including an engine, an engine crankshaft, the ends of said crankshaft extending beyond said engine, a first fluid torque converter disposed proximate one end of said crankshaft, said torque converter including an impeller, a turbine and an output shaft, clutch means for coupling said impeller to said crankshaft, said turbine being adapted to drive said output shaft, a speed changing device operatively connected intermediate said turbine and said output shaft, said device being adapted to drive said output shaft at a different speed from that of said turbine member, a second fluid torque converter disposed proximate the other end of said crankshaft, clutch means for coupling said second torque converter to said engine, a pair of driving axles, a differential mechanism adapted to transmit drive to said axles, a drive element connecting said first converter output shaft to said differential, and a similar drive element operatively connecting said second torque converter to said differential.

9. A motor vehicle power transmission device including in combination an engine, a pair of fluid torque converters, means selectively coupling said engine and said torque converters, a pair of driving axles, a differential mechanism adapted to drive said axles, and means for drivingly connecting each of said torque converters to the differential, said means including a clutch mechanism adapted to automatically disconnect the driving connection between each torque converter and the differential when the speed of the differential exceeds that of the torque converter.

10. A motor vehicle including in combination a pair of driving axles, an engine having a crankshaft substantially parallel to the axis of said axles, a pair of fluid torque converters, means for coupling one converter to one end of said crankshaft, means for coupling the other converter to the other end of said crankshaft, a differential device adapted to transmit drive to said axles, means for drivingly connecting said torque converters to said differential device, said latter connecting means including a one-way clutch device adapted to disconnect the driving connection between the converter and the differential when the speed of the differential exceeds that of the converter.

11. A power transmission mechanism having an engine and an output load shaft, means providing a pair of parallel power paths connected between said engine to said output load shaft, said means including a pair of series connected torque multiplying devices in one of said power paths, and a single torque multiplying device in the other power path, clutches for selectively coupling said engine to said means so that drive to said output load shaft may be through said power paths severally or jointly, means adapted to combine the torque outputs of said torque multiplying devices, and means drivingly connecting said combining means to said output load shaft.

12. A motor vehicle power transmission mechanism having an engine, a pair of wheel driving axles, a differential device drivingly connected to said axles and means providing a pair of power paths connected in parallel between said engine and said differential, said means including a first fluid torque converter and a planetary gear set serially connected in one power path, a second fluid torque converter in the other power path, individual clutch devices for selectively coupling said engine to each of said fluid torque converters, means for coupling said gear set to said differential and means for coupling said second torque converter to said differential.

13. A motor vehicle power transmission mechanism of the type described in claim 12 in which the respective means for coupling said gear set and said second torque converter to said differential includes a one-way clutch adapted to disconnect the driving connection to the differential when the speed of the latter exceeds that of the gear set or second converter.

References Cited in the file of this patent

UNITED STATES PATENTS

| 1,614,819 | Bauer et al. | Jan. 18, 1927 |
| 2,004,215 | Peterson | June 11, 1935 |
| 2,310,513 | Burns | Feb. 9, 1943 |

FOREIGN PATENTS

| 474,790 | Great Britain | Nov. 8, 1937 |